US00RE40785E

(19) United States
(12) Reissued Patent
Waldenstrom

(10) Patent Number: US RE40,785 E
(45) Date of Reissued Patent: Jun. 23, 2009

(54) METHOD OF MAKING A SUBMICRON CEMENTED CARBIDE WITH INCREASED TOUGHNESS

(75) Inventor: Mats Waldenstrom, Bromma (SE)

(73) Assignee: Sandvik Intellectual Property Aktiebolag, Sandviken (SE)

(21) Appl. No.: 11/484,835

(22) Filed: Jul. 12, 2006

Related U.S. Patent Documents

Reissue of:
(64) Patent No.: 6,214,287
Issued: Apr. 10, 2001
Appl. No.: 09/544,171
Filed: Apr. 6, 2000

(30) Foreign Application Priority Data

Apr. 6, 1999 (SE) ..... 9901207-2

(51) Int. Cl.
*B22F 1/02* (2006.01)

(52) U.S. Cl. ..... 419/18; 419/35; 419/38; 75/240

(58) Field of Classification Search ..... 419/18
See application file for complete search history.

(56) References Cited

U.S. PATENT DOCUMENTS 3,914,507 A * 10/1975 Fustukian ..... 428/404
5,505,902 A 4/1996 Fischer et al.
5,529,804 A 6/1996 Bonneau et al.
5,993,730 A 11/1999 Waldenström et al.
6,126,709 A * 10/2000 Åkerman et al. ..... 75/240
6,294,129 B1 * 9/2001 Waldenstrom ..... 419/18
6,468,680 B1 * 10/2002 Waldenstrom et al. ..... 428/698
6,673,307 B1 * 1/2004 Lindholm et al. ..... 419/18

FOREIGN PATENT DOCUMENTS

| | | |
|---|---|---|
| EP | 819490 | 1/1998 |
| GB | 346473 | 4/1931 |
| GB | 1438728 | 6/1976 |

OTHER PUBLICATIONS

Patent Abstracts of Japan, vol. 018, No. 487 (M–1671), Sep. 12, 1994 & JP 06 158114 A (Mitsubishi Materials Corp), Jun. 7, 1994.
Patent Abstracts of Japan, vol. 017, No. 442 (C–1097), Aug. 16, 1993 & JP 05 098385 A (Sumitomo Electric Ind Ltd), Apr. 20, 1993.

* cited by examiner

*Primary Examiner*—Roy King
*Assistant Examiner*—Christopher Kessler
(74) *Attorney, Agent, or Firm*—Drinker Biddle & Reath LLP

(57) ABSTRACT

The present invention relates to a method of making a cemented carbide comprising WC, 6–12 wt. % Co and 0.1–0.7 wt. % Cr, wherein the WC-grains are coated with Cr prior to mixing and no milling takes place during the mixing step. As a result a cemented carbide with improved properties is obtained.

11 Claims, No Drawings

METHOD OF MAKING A SUBMICRON CEMENTED CARBIDE WITH INCREASED TOUGHNESS

Matter enclosed in heavy brackets [ ] appears in the original patent but forms no part of this reissue specification; matter printed in italics indicates the additions made by reissue.

*CROSS-REFERENCE TO RELATED APPLICATIONS*

*The present application is a reissue of U.S. Pat. No. 6,214,287 B1, filed Apr. 6, 2000, which claims the benefit of priority to Swedish Application No. 9901207-2 filed Apr. 6, 1999.*

BACKGROUND OF THE INVENTION

The present invention relates to a cemented carbide cutting tool insert, particularly useful for turning, milling and drilling in steels and stainless steels.

Conventional cemented carbide inserts are produced by powder metallurgical methods including milling of a powder mixture forming the hard constituents and the binder phase, pressing and sintering. The milling operation is an intensive milling in mills of different sizes and with the aid of milling bodies. The milling time is of the order of several hours up to several days. Such processing is believed to be necessary in order to obtain a uniform distribution of the binder phase in the milled mixture. It is further believed that the intensive milling causes reactivity of the mixture which further promotes the formation of a dense structure. However, milling has its disadvantages. During the long milling time the milling bodies are worn and contaminate the milled mixture. Furthermore even after an extended milling a random rather than an ideal homogeneous mixture may be obtained. Thus, the properties of the sintered cemented carbide containing two or more components depend heavily on how the starting materials are mixed.

There exist alternative technologies to intensive milling for production of cemented carbide. For example, particles can be coated with binder phase metal. The coating methods include fluidized bed methods, solgel techniques, electrolytic coating, PVD coating or other methods such as disclosed in e.g. GB 346,473, U.S. Pat. Nos. 5,529,804 or 5,505,902. Coated carbide particles can be mixed with additional amounts of cobalt and other carbide powders to obtain the desired final material composition, pressed and sintered to form a dense structure. U.S. Pat. No. 5,993,730 discloses a method of coating carbide particles with V, Cr, Ti, Ta or Nb.

During metal cutting operations like turning, milling and drilling the general properties of the material such as hardness, resistance against plastic deformation, and resistance against formation of thermal fatigue cracks are to a great extent related to the volume fraction of the hard phases and the binder phase in the sintered cemented carbide body. It is well known that increasing the amount of the binder phase reduces the resistance to plastic deformation. Different cutting conditions require different properties of the cutting insert. When cutting in steels with raw surface zones (e.g. rolled, forged or cast) a coated cemented carbide insert must consist of tough cemented carbide and have a very good coating adhesion as well. When turning, milling or drilling in low alloyed steels or stainless steels the adhesive wear is generally the dominating wear type.

Measures can be taken to improve the cutting performance with respect to a specific wear type. However, such action will often have a negative effect on other wear properties.

SUMMARY OF THE INVENTION

It has now surprisingly been found that cemented carbide inserts made from powder mixtures with Cr-coated submicron hard constituents and manufactured without conventional milling have excellent toughness performance for machining of steels and stainless steels.

The present invention provides a method of manufacturing a cemented carbide powder, comprising the steps of: coating a hard constituent powder with a coating selected from the group of Cr and Cr+Co to form a coated hard constituent powder, wet-mixing without milling the coated hard constituent powder and with binder metal and pressing agent, to form a wet-mixed powder, and drying said wet-mixed powder to form a dried cemented carbide powder.

DETAILED DESCRIPTION OF PREFERRED EMBODIMENTS

According to the invention there is now provided cemented carbide inserts with excellent toughness properties for machining of steels and stainless steels made from a dried powder of WC and 6–12 wt. % Co, preferably 8–11 wt. % Co, most preferably 9.5–10.5 wt. % Co and 0.1–0.7 wt. % Cr, preferably 0.2–0.5 wt. % Cr. The WC-grains preferably have an average grain size in the range 0.2–1.0 μm, more preferably 0.6–0.9 μm.

The microstructure of cemented carbide according to the invention is preferably further characterized by a grain size distribution of WC in the range 0–1.5 μm.

The amount of W dissolved in binder phase is controlled by adjustment of the carbon content by small additions of carbon black or pure tungsten powder. The W-content in the binder phase can be expressed as the "CW-ratio" defined as $$\text{CW-ratio}=M_s/(\text{wt. \% Co} * 0.0161)$$

where $M_s$ is the measured saturation magnetization of the sintered cemented carbide body in [kA/m] *$hAm^2/kg$* and wt. % Co is the weight percentage of Co in the cemented carbide. The CW-ratio in inserts according to the invention should preferably be 0.80–1.0, more preferably 0.8–0.90.

The sintered inserts according to the invention are used coated or uncoated, preferably coated with conventional PVD (TiCN+TiN) or PVD (TiN).

According to the method of the present invention coated WC-powder with submicron grain size distribution is wet mixed without milling with binder metal and pressing agent, dried preferably by spray drying, pressed to inserts and sintered.

WC-powder with grain size distribution according to the invention with coarse grains tails greater than 1.5 μm having been eliminated can be prepared by milling and sieving such as in a jetmill-classifier. It is an important feature of the invention that the milling takes place without milling i.e. there should be no change in grain size or grain size distribution as a result of the mixing.

According to the method of the present invention the submicron hard constituents, after careful deagglomeration are coated with a grain growth inhibitor metal such as Cr, V, Mo, W, preferably Cr using methods disclosed in U.S. Pat. No. 5,993,730 and, optionally, an iron group binder metal, preferably Co, using methods disclosed in patent U.S. Pat. No. 5,529,804. In such case the cemented carbide powder obtained from the above method includes Cr-coated, or optionally Cr+Co coated, WC, possibly with further additions of Co-powder in order to obtain the desired final composition.

The following examples are given to illustrate various aspects of the invention.

EXAMPLE 1

Cemented carbide tool inserts of the type N151.2-400-4E, an insert for parting, with a composition having WC, 0.4 wt. % Cr, and 10 wt. % Co, with a grain size of 0.8 μm, were produced according to the invention. Chromium and cobalt coated WC with 0.44 weight % Cr and 2.0 weight % Co, prepared according to U.S. Pat. Nos. 5,993,730 and 5,529,804 was mixed with additional amounts of Co to obtain the desired material composition. The mixing was carried out in ethanol (0.25 fluid per kg cemented carbide powder) for 2 hours in a laboratory mixer and the batch size was 10 kg. Furthermore, 2 wt. % lubricant, was added to the slurry. The carbon content was adjusted with carbon black to a binder phase alloyed with W to obtain a CW-ratio of 0.85. After spray drying, the inserts were pressed and sintered according to standard practice and dense structures with porosity A00 and hardness HV3=1550 were obtained.

EXAMPLE 2

Cemented carbide tool inserts of the type N151.2-400-4E were produced in the same way as in Example 1 but from chromium and cobalt coated WC having 0.22 weight % Cr, 2.0 weight % Co and with a final powder composition of WC of 0.2 weight % Cr and 10.0 weight % Co. The same physical properties (porosity A00; HV3=1550) as in Example 1 were obtained.

EXAMPLE 3

Cemented carbide tool inserts of the type N151.2-400-4E were produced in the same way as in Example 1 but from chromium coated WC having 0.44 weight % Cr and with a final powder composition of the WC of 0.4 weight % Cr and 10.0 weight % Co. The same physical properties (porosity A00; HV3=1550) as in Example 1 were obtained.

EXAMPLE 4

Cemented carbide tool inserts of the type N151.2-400-4E were produced in the same way as in Example 1 but from chromium coated WC having 0.22 weight % Cr and with a final powder composition of WC, 0.2 weight % Cr and 10.0 weight % Co. The same physical properties (porosity A00; HV3=1550) as in Example 1 were obtained.

Comparative Example 1

Cemented carbide standard tool inserts of the type N151.2-400-4E were produced with the same chemical composition, average grain size of WC and CW ratio as in Example 1 but from powder manufactured with a conventional ball milling technique. The same physical properties (porosity A00; HV3=1550) as in Example 1 were obtained.

Comparative Example 2

Cemented carbide standard tool inserts of the type N151.2-400-4E were produced with the same chemical composition, average grain size of WC and CW-ratio as in Example 1 but from powder manufactured with the a conventional ball milling technique and with the powder composition WC, 0.2 weight % Cr and 10.0 weight % Co. Initial abnormal grain growth and reduction in hardness compared to Example 1 (porosity A00; HV3=1500) were obtained.

EXAMPLE 5

Sintered inserts from Examples 1–4 and Comparative Examples 1 and 2 were treated in a standard PVD (TiCN+TiN) coating process with all inserts charged in the same coating batch.

Coated inserts according to the invention from Examples 1–4 were compared in toughness behaviour against coated reference inserts from Comparative Examples 1 and 2 in a technological parting test.

The test data were:

| | | |
|---|---|---|
| Operation: | Parting off 3 mm thick discs from a bar | |
| Material: | SS1672, diameter 46 mm | |
| Cutting data: | | |
| Speed = 150 m/min | | |
| Feed = 0.33 mm/rev | diameter | 46-8 mm |
| Feed = 0.05 mm/rev | diameter | 8-4 mm |
| Feed = 0.03 mm/rev | diameter | 4-0 mm |
| Number of subtests (edges): | 3 | |
| Evaluation of toughness: | Number of cuts before fracture | |
| Results | | |
| Example | No. of cuts | |
| 1 | 220 | |
| 2 | 270 | |
| 3 | 210 | |
| 4 | 280 | |
| Comp. 1 (prior art) | 180 | |
| Comp. 2 (prior art) | 160 | |

As clearly demonstrated by the above comparative data, cemented carbide bodies formed consistent with the principles of the present invention possess unexpectedly superior properties when compared to conventional materials.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by those skilled in the art without departing from the scope of the present invention as defined by the following claims.

I claim:

1. A method of manufacturing a cemented-carbide powder, comprising the steps of:

(i) coating a hard constituent powder comprising WC with a coating selected from the group consisting of Cr and Cr+Co to form a coated hard constituent powder;

(ii) wet-mixing, without milling, the coated WC-powder with binder metal and pressing agent, to form a wet-mixed powder; [and]

(iii) drying said wet-mixed powder to form a dried cemented carbide powder*;*

*(iv) pressing the dried cemented carbide powder to form a shaped body; and*

*(v) sintering the shaped body,*

*wherein the dried cemented carbide powder has a CW-ratio of 0.8 to 1.0, where the CW-ratio is defined as*

$$CW\text{-}ratio = M_s/(wt.\ \%\ Co * 0.0161)$$

*where $M_s$ is the saturation magnetization of the sintered cemented carbide body in $hAm^2/kg$ and wt % Co is the weight percentage of Co in the cemented carbide.*

2. The method of claim 1, wherein step (i) further comprises adding Co powder to the coated hard constituent powder.

3. The method of claim 1, wherein the dried powder has an average WC grain size between 0.2 and 1.0 μm.

4. The method of claim 1, wherein the dried powder has an average WC grain size between 0.6 and 0.9 μm.

5. The method of claim 1, wherein the dried powder has a WC grain size distribution between 0 and 1.5 μm.

6. The method of claim 2, wherein the amounts of Cr and Co are such that the dried cemented carbide powder comprises 6–12 wt. % Co and 0.1–0.7 wt. % Cr.

7. The method of claim 2, wherein the amounts of Cr and Co are such that the dried cemented carbide powder comprises 8–11 wt. % Co and 0.2–0.5 wt. % Cr.

8. The method of claim 7, wherein the dried cemented carbide powder comprises 9.5–10.5 wt. % Co.

[9. The method of claim 1, further comprising the steps of:

(iv) pressing the dried cemented carbide powder to form a shaped body; and (v) sintering the shaped body.]

[10. The method according to claim 9, wherein the dried cemented carbide powder has a CW-ratio of 0.8 to 1.0, where the CW-ratio is defined as $$\text{CW-ratio}=M_s/(\text{wt. \% Co} * 0.0161)$$

wherein $M_s$ is the saturation magnetization of the sintered cemented carbide body in kA/m and wt % Co is the weight percentage of Co in the cemented carbide.]

11. The method of claim [10]*1*, wherein the shaped body comprises a cutting insert.

12. A cutting insert made by the method of claim 11.

*13. The method of claim 1 wherein the CW-ratio is 0.8–0.9.*

* * * * *